US008213428B2

(12) United States Patent
Fagerness et al.

(10) Patent No.: US 8,213,428 B2
(45) Date of Patent: Jul. 3, 2012

(54) METHODS AND APPARATUS FOR INDEXING MEMORY OF A NETWORK PROCESSOR

(75) Inventors: Gerald G. Fagerness, Rochester, MN (US); Kerry C. Imming, Rochester, MN (US); Brian M. McKevett, Rochester, MN (US); James F. Mikos, Rochester, MN (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 3176 days.

(21) Appl. No.: 10/625,954

(22) Filed: Jul. 24, 2003

(65) Prior Publication Data
US 2005/0018684 A1     Jan. 27, 2005

(51) Int. Cl.
*H04L 12/56* (2006.01)
(52) U.S. Cl. ...................................... 370/392; 370/395.7
(58) Field of Classification Search .................. None
See application file for complete search history.

(56) References Cited

U.S. PATENT DOCUMENTS

| | | | | |
|---|---|---|---|---|
| 5,414,701 A | * | 5/1995 | Shtayer et al. | 370/395.3 |
| 6,034,958 A | * | 3/2000 | Wicklund | 370/395.32 |
| 6,044,077 A | * | 3/2000 | Luijten et al. | 370/392 |
| 6,272,504 B1 | * | 8/2001 | Baentsch et al. | 707/206 |
| 6,327,261 B1 | * | 12/2001 | Makoua et al. | 370/392 |
| 6,356,552 B1 | * | 3/2002 | Foglar | 370/395.1 |
| 2010/0020802 A1 | * | 1/2010 | Willis | 370/395.1 |

* cited by examiner

Primary Examiner — Robert Scheibel
(74) Attorney, Agent, or Firm — Dugan & Dugan PC

(57) ABSTRACT

A method is provided for address mapping in a network processor. The method includes the steps of (1) determining a port number of a port that receives a data cell; (2) determining a virtual path identifier and a virtual channel identifier for the data cell; and (3) creating a first index based on at least one of the port number, the virtual path identifier and the virtual channel identifier. The method further includes (1) accessing one of a plurality of entries stored in a first on-chip memory using the first index; (2) creating a second index based on the accessed entry of the first on-chip memory; and (3) accessing an entry of a second memory based on the second index. Numerous other aspects are provided.

15 Claims, 4 Drawing Sheets

| Entry in First Memory | First Memory Base Offset | Number of LSBs of the Port No. to be Selected | Number of LSBs of the VPI to be Selected | Number of LSBs of the VCI to be Selected |
|---|---|---|---|---|
| Entry 1 | 0 0000 0000 | 000 | 1000 | 0 1000 |
| Entry 2 | 0 1000 0000 | 000 | 0010 | 0 1100 |
| Entry 3 | 0 1010 0000 | 000 | 0100 | 0 0100 |
| Entry 4 | 0 1010 0001 | — | — | — |

FIG. 3

METHODS AND APPARATUS FOR INDEXING MEMORY OF A NETWORK PROCESSOR

FIELD OF THE INVENTION

The present invention relates generally to network processor technology, and more particularly to methods and apparatus for indexing memory of a network processor.

BACKGROUND OF THE INVENTION

Network processors often are employed for transmitting data into and out of devices coupled to a network (e.g., switches, routers, etc.). One such network in which network processors are employed is an asynchronous transfer mode (ATM) network.

In an ATM network, data is transmitted using cells that include 48 bytes of information fields and 5 bytes of header fields. Routing occurs via virtual channel connections and virtual path connections, with virtual channel connections being addressed using a 16-bit virtual channel-identifier (VCI) and virtual path connections being addressed using a 12-bit virtual path identifier (VPI). The VCI and VPI for a data cell form part of the 5 bytes of header fields of the data cell.

A 16-bit VCI allows for $2^{16}$=65,536 unique virtual channel connections, and a 12-bit VPI allow for $2^{12}$=4096 unique virtual path connections. Accordingly, 4096×65,536=268,435,456 connections are supported within an ATM network and at least an 8 Gbyte memory is required to accommodate the switching/control information for all of these connections (e.g., assuming a 32 byte control block size is employed). Despite such a large number of available connections, in practice, typically only tens, hundreds, or in some cases thousands, of connections are active within a network device/network processor coupled to an ATM network.

For each received cell, a network processor accesses one or more entries in a table (e.g., an off-chip memory) that contains a receive control block (RCB) for the cell. Each RCB may include, for example, switching/control information for received cells, and may be accessed via an RCB index.

An RCB index generally is based on the VPI and VCI fields of a received cell. Because each incoming port of a network processor may have an overlapping set of VPIs and VCIs, the port number of the port receiving a cell may be included in the RCB index. For example, to create an RCB index for a received cell, a mapping algorithm may be employed to select certain bits of the VPI, VCI and port number fields and to combine the bits to form the RCB index. The RCB index then may be shifted and added to a memory base offset to find the actual memory address of an RCB.

Straight mapping of VPI, VCI and/or port number field bits into an RCB index has disadvantages. For example, assume "X" VPI bits and "Y" VCI bits are employed for an RCB index. A corresponding memory that stores RCBs would be divided into $2^X$ equal sections, and each section would be subdivided into $2^Y$ equal subsections (e.g., representing X virtual paths each having Y virtual channels). Such an approach is inefficient in that all virtual paths are assumed to have the same number of virtual channels. In practice, however, the number of virtual channels per virtual path may vary, and the memory space for virtual paths having fewer than Y channels is wasted. That is, unused memory is allocated to RCBs that do not exist.

One conventional approach for creating an RCB index employs a 24 bit "strand" comprising 24 bits from the VPI and VCI fields of a received cell. Unused bits of the strand are zeroed, and the 24 bit strand is employed to address a table entry which contains a 16 bit memory address location of an RCB. Disadvantages of such an approach are that the logic required to create the 24 bit strand and the $2^{24}$=16,777,216 (16 Mb) memory required for a 16 bit memory address space are duplicated for each port, and each 16 Mbyte memory is located off-chip (e.g., an external memory access is required for every cell received, consuming valuable memory bandwidth). Accordingly, improved methods and apparatus for indexing memory of a network processor would be desirable.

SUMMARY OF THE INVENTION

In a first aspect of the invention, a method is provided for determining a control block index for a data cell received by a network processor coupled to an ATM network. The method includes receiving a data cell at a port, the data cell having a virtual path identifier and a virtual channel identifier; (2) determining a port number for the port; and (3) employing bits of at least one of the virtual path identifier, the virtual channel identifier and the port number to create a first address. The first address then is employed to access a first memory and to obtain a first entry from the first memory. The first entry specifies (1) a first memory base offset address; (2) a number of bits of the port number to use in the control block index; (3) a number of bits of the virtual path identifier to use in the control block index; and (4) a number of bits of the virtual channel identifier to use in the control block index. The method further includes employing the first memory base offset address and the number of bits of the port number, virtual path identifier and virtual channel identifier specified by the first entry to create a control block index for the data cell.

In a second aspect of the invention, a method is provided for address mapping in a network processor. The method includes the steps of (1) determining a port number; (2) receiving a virtual path identifier and a virtual channel identifier; and (3) creating a first index based on at least one of the port number, the virtual path identifier and the virtual channel identifier. The method further includes (1) accessing one of a plurality of entries stored in a first on-chip memory using the first index; (2) creating a second index based on the one of a plurality of entries stored in the first on-chip memory; and (3) accessing an entry in a second memory based on the second index. Numerous other aspects are provided, as are systems and apparatus in accordance with these and other aspects of the invention.

Other features and aspects of the present invention will become more fully apparent from the following detailed description, the appended claims and the accompanying drawings.

BRIEF DESCRIPTION OF THE DRAWINGS

FIG. 3 is a schematic diagram of exemplary contents of a portion of the first on-chip memory of FIG. 1.

DETAILED DESCRIPTION

Figure 1:
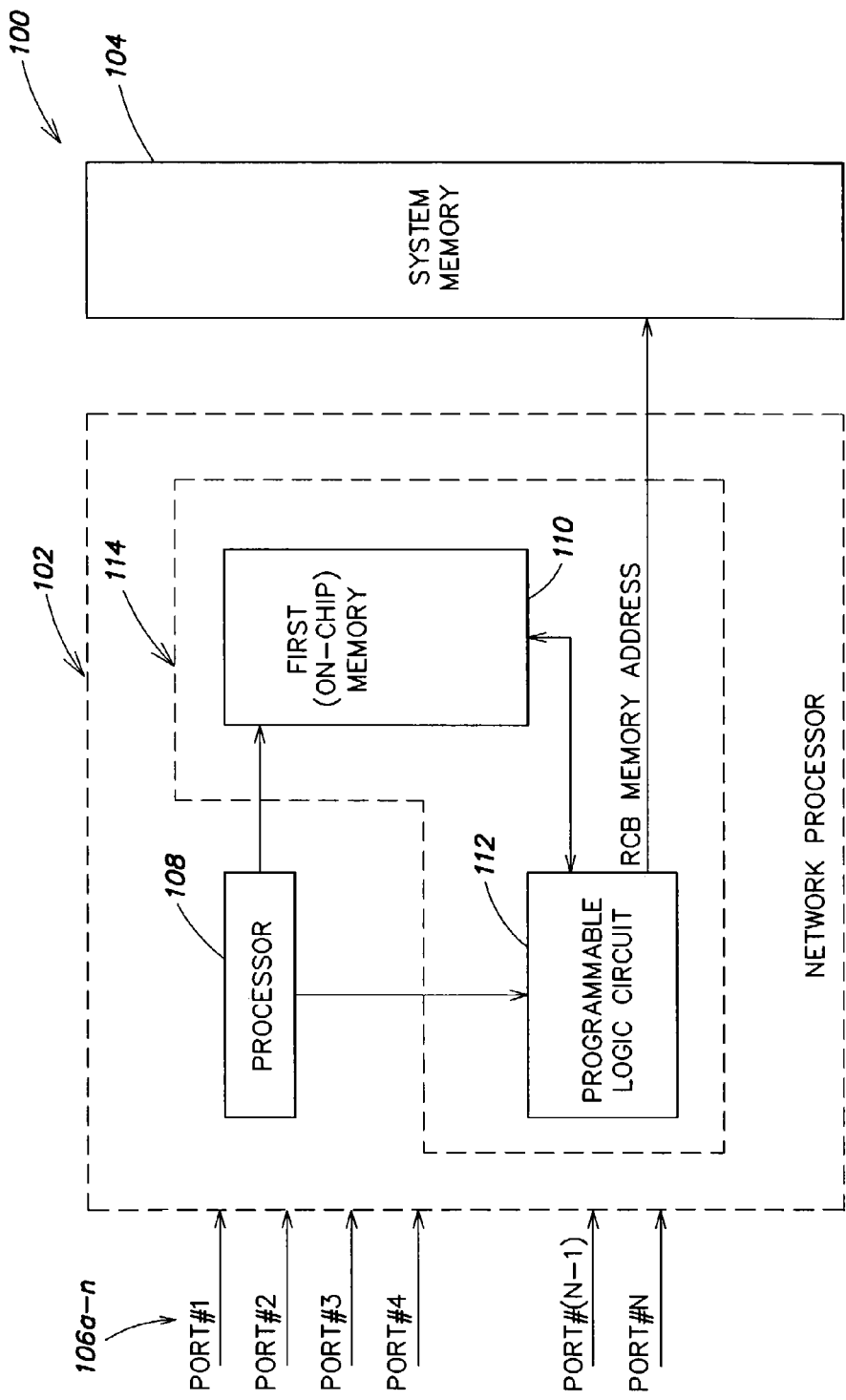
FIG. 1 is a block diagram of an inventive system for determining a control block index for a data cell received by a network processor coupled to an ATM-network.

FIG. 1 is a block diagram of an inventive network processor system 100 for indexing a memory of a network processor that is coupled to an asynchronous transfer mode (ATM) network. With reference to FIG. 1, the network processor system 100 includes a network processor circuit 102 (shown in phantom) coupled to a system memory 104 adapted to store a plurality of receive control blocks or "RCBs" (not separately shown). As described previously, RCBs may include, for example, switching/control information for data cells received by the network processor circuit 102.

The network processor circuit 102 includes a plurality of ports 106a-n (labeled PORT #1, PORT #2, etc., in FIG. 1) for receiving data cells transmitted over an ATM network (not shown) to which the network processor system 100 is coupled. In one embodiment of the invention, 16 ports are provided, although other numbers of ports may be employed. The network processor circuit 102 also includes a processor 108, a first, on-chip memory 110 and a programmable logic circuit 112 coupled to both the processor 108 and the first, on-chip memory 110. As used herein, an "on-chip" memory refers to a memory that is on the same die or silicon as the network processor. For convenience, the first, on-chip memory 110 and the programmable logic circuit 112 are referred to collectively as on-chip hardware 114.

The system memory 104 may comprise any memory capable of storing RCBs for the network processor system 100 (e.g., a 64 megabyte or 1 gigabyte DRAM). In at least one embodiment of the invention, each receive control block is 32 bytes in length, and the system memory 104 is configured to store 1 byte at each memory location of the system memory 104. Accordingly, 32 system memory locations are required for each receive control block. Other system memory configurations may be employed.

The processor 108 may comprise one or more conventional microprocessors, such as one or more IBM PowerPC® processors. The first, on-chip memory 110 may comprise a suitably-sized random access memory, such as an SRAM or other similar memory. As described further below, the programmable logic circuit 112 may include, for example, dedicated and/or customizable hardware such as an application specific integrated circuit (ASIC) having one or more programmable components (e.g., registers). Such programmable components may be programmed, for example, via the processor 108 (e.g., via computer program code stored and/or executed by the processor 108).

In accordance with the present invention, and as described further below, the network processor system 100 may receive data cells via the ports 106a-n and provide a simple and efficient mapping to an RCB (stored in the system memory 104) for each received cell. Specifically, after a data cell is received at one of the ports 106a-n, the programmable logic circuit 112 employs bits of at least one of:

(1) the number of the port that received the data cell;
(2) the virtual path identifier (VPI) of the data cell; and
(3) the virtual channel identifier (VCI) of the data cell;

to generate an address for the first, on-chip memory 110. The bits of the port number, virtual path identifier and/or virtual channel identifier may be provided, for example, by the processor 108. The programmable logic circuit 112 then employs the generated address to obtain an entry of the first on-chip memory; and employs the entry to create a receive control block index. For example, the entry may specify a memory base offset address and which bits of the port number, VPI and/or VCI are to form part of the receive control block index. The programmable logic circuit 112 then may generate a receive control block memory address from the receive control block index, and the receive control block memory address may be used to access an RCB of the system memory 104. For example, the RCB index may be shifted (e.g., to the left) and added to a main system memory base offset address.

Through use of the present invention, the disadvantages of "straight mapping" of the VPI, VCI and/or port number to create an RCB index are reduced and/or eliminated. Namely, the network processor system 100 may accommodate virtual paths that have a varying number of virtual channels per virtual path without an undue waste of memory space. Further, the logic and memory required to implement the present invention accommodates all ports of the network processor system 100 (e.g., the logic and memory need not be duplicated for each port), and may be implemented on-chip. In this manner, additional external memory accesses for every received cell are avoided, and memory bandwidth is conserved.

Figure 2:
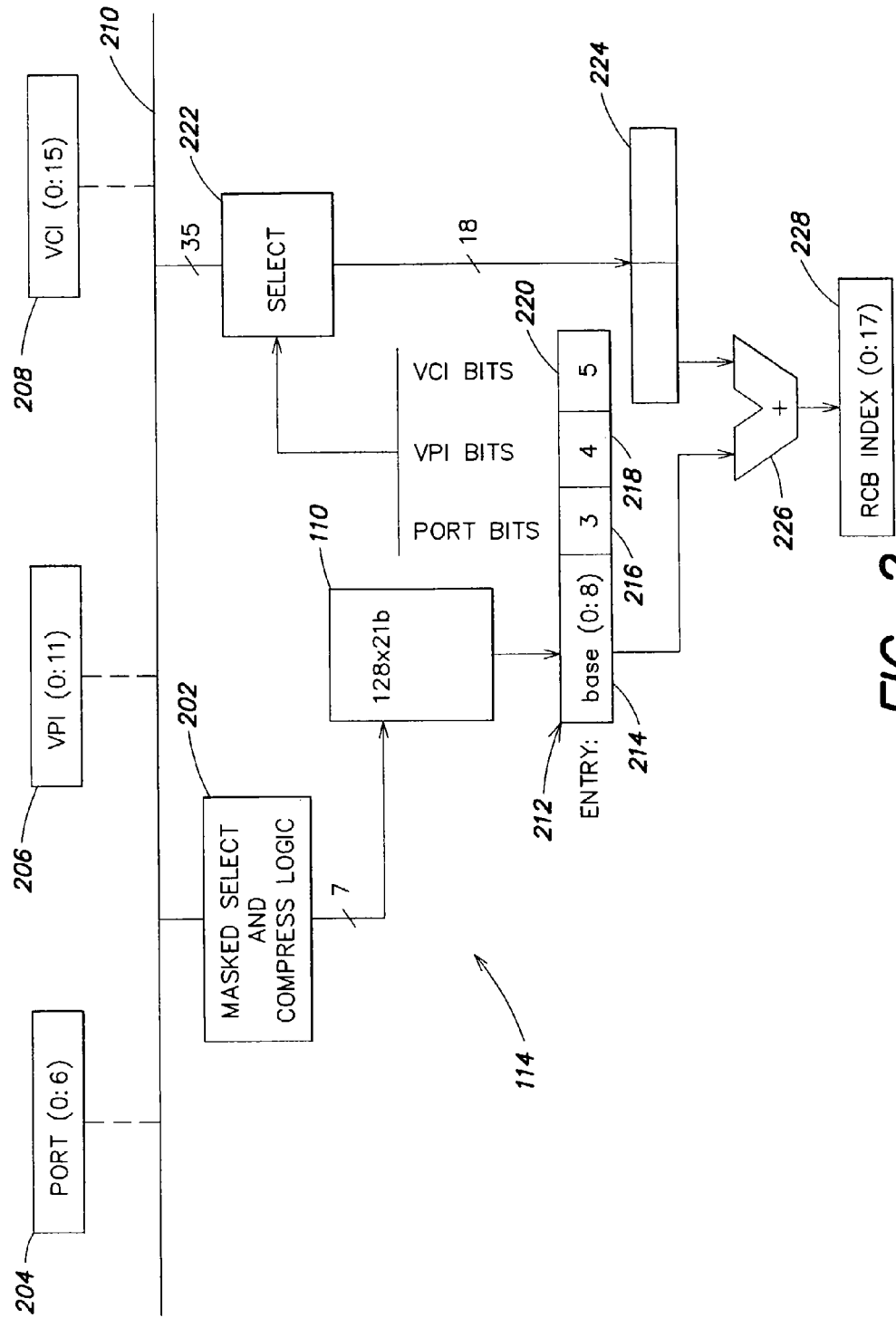
FIG. 2 is a block diagram of the programmable logic circuit of FIG. 1.

FIG. 2 is an exemplary embodiment of the on-chip hardware 114 of FIG. 1. With reference to FIG. 2, the on-chip hardware 114 includes masked select and compress logic 202 coupled to the first, on-chip memory 110 (which in the embodiment shown is a 128-entry memory that stores 21 bits per entry). As will be described further below, the masked select and compress logic 202 is adapted to receive one or more bits of (1) a number of a port of the network processor 102 (FIG. 1) that received a data cell; (2) the VPI of the received data cell; and/or (3) the VCI of the received data cell, and to generate an address based on the received bits. For example, circuitry (not shown) of the on-chip hardware 114 may determine the port number, the VPI and the VCI associated with a received cell and may provide one or more bits of the port number, the VPI and the VCI to the masked select and compress logic 202 as represented by reference numerals 204, 206 and 208, respectively, in FIG. 2. Alternatively, the processor 108 (FIG. 1) may provide one or more bits of the port number, the VPI and the VCI to the masked select and compress logic 202. In the embodiment shown, 7 bits of the port number, 12 bits of the VPI and 16 bits of the VCI are provided to the masked select and compress logic 202 (e.g., via a bus 210). Other numbers of bits of the port number, VPI and/or VCI may be provided.

The first, on-chip memory 110 is adapted to receive the address generated by the masked select and compress logic 202, and to output a corresponding one of its entries in response thereto (as represented by entry 212 in FIG. 2). As stated, in the embodiment shown, the first, on-chip memory 110 is a 128-entry memory (e.g., an SRAM or the like) that is adapted to stores 21 bits per entry. If the first, on-chip memory 110 includes error correction code (ECC) at each entry, a 27-bit entry size may be employed. Other memory sizes and/or entry sizes may be used.

As will be described further below, use of the first, on-chip memory 110 effectively divides the system memory 104 (FIG. 1) into "portions" of memory locations, with the number of portions of memory locations being equal to the number of entries in the first, on-chip memory 110 (e.g., 128 in FIG. 2). Each entry in the first, on-chip memory 110 in turn provides (1) addressing to a portion of the system memory 104 (e.g., via a first memory base offset); and (2) addressing within the portion of the system memory 104 (e.g., via a plurality of port number, VPI and/or VCI bits). For example, each entry in the first, on-chip memory 110 may include (1) a first memory base offset field 214; (2) a port number bits field 216; (3) a VPI bits field 218; and/or (4) a VCI bits field 220.

In the embodiment of FIG. 2, the first memory base offset field 214 comprises 9 bits, the port number bits field 216 comprises 3 bits, the VPI bits field 218 comprises 4 bits and the VCI bits field 220 comprises 5 bits. Other numbers of bits may be employed for the first memory base offset field 214, the port number bits field 216, the VPI bits field 218 and/or the VCI bits field 220.

As shown in FIG. 2, the port number bits field 216, the VPI bits field 218 and the VCI bits field 220 output by the first, on-chip memory 110 serve as select inputs of a selection circuit 222. Based on the values stored in the port number bits field 216, the VPI bits field 218 and the VCI bits field 220, the selection circuit 222 selects a plurality of bits of the port number, the VPI and/or the VCI (for the corresponding received data cell) provided to the selection circuit 222 (e.g., via the bus 210), and outputs the bits to a register 224. In the embodiment shown in FIG. 2, a total of eighteen bits from one or more of the port number, VPI and VCI are stored within the register 224. Other numbers of bits may be employed.

The bits stored within the register 224 serve as a first input to an adder 226. In at least one embodiment, the first memory base offset field 214 is shifted to the left by nine bits and serves as a second input to the adder 226, and is added to the bits of the register 224 so as to generate an RCB index 228 (e.g., an 18-bit index, although other index sizes may be employed). As will be described further below, the RCB index 228 may be added to a system memory base offset to generate an RCB main memory address (FIG. 1) that may be used by a memory controller (not shown) of the network processor system 100 to access RCBs stored within the system memory 104.

Before describing the operation of the on-chip hardware 114 of FIG. 2 (described below with reference to FIG. 4), selection of the bits to be used by the masked select and compress logic 202 to address the first, on-chip memory 110 and selection of each entry within the first, on-chip memory 110 will be described. Such selections may be performed, for example, at start-up of the network processor system 100 (or at any other suitable time) and/or by the processor 108 (e.g., via computer program code (not shown) executable by the processor 108).

As stated, the masked select and compress logic 202 is adapted to receive one or more bits of the port number, the VPI and/or the VCI associated with a received data cell, select a certain number of the received bits (e.g., by applying a suitable mask), and "compress" or arrange the selected bits so as to form an address for the first, on-chip memory 110. For example, a combination of AND logic and shift registers may be employed for such selection/compression operations.

Selection of the bits to be used by the masked select and compress logic 202 depends on the configuration of the network processor system 100 being employed (e.g., the number of ports, paths for each port, channels for each path, etc., present within the network processor system 100). Generally, if only port bits are employed by the masked select and compress logic 202, then the system memory 104 will be divided into a plurality of portions each being associated with a different port (e.g., 128 portions in the embodiment of FIG. 2). Each portion of the system memory 104 associated with a port, in turn, may contain receive control blocks that relate to the virtual paths and virtual channels of the port associated with that portion of the system memory 104. That is, all receive control blocks that relate to the virtual paths and virtual channels of a port will be contained within the same portion of the system memory 104. Alternatively, if VCI and/or VPI bits (in addition to port number bits) of a received data cell are employed by the masked select and compress logic 202 to generate an address for the first, on-chip memory 110, then receive control blocks that relate to the virtual paths and virtual channels of a port may be contained within multiple portions of the system memory 104.

As stated previously, each entry in the first, on-chip memory 110 provides (1) addressing to a portion of the system memory 104 (e.g., via the first memory base offset field 214); and (2) addressing within the portion of the system memory 104 (e.g., via the port number bits field 216, the VPI bits field 218 and/or the VCI bits field 220). More specifically, each first memory base offset field 214, when combined with a main system memory offset, identifies a starting address for each portion of the system memory 104 (set by the number of entries of the first, on-chip memory 110). Further, selection of the number of bits of the first memory base offset field 214 determines the minimum spacing of each portion of the system memory 110; For example, in the embodiment of FIG. 2, the first memory base offset field 214 includes 9 bits so that each portion of the system memory 104 (defined by the number of entries of the first, on-chip memory 110) has at least $2^9=512$ receive control blocks. Other minimum system memory portion sizes may be employed.

The port number bits field 216 specifies the number of the bits (e.g., least significant bits) of the port number associated with a received data cell that will be selected by the selection circuit 222. Likewise, the VPI bits field 218 and the VCI bits field 220 specify the number of bits (e.g., least significant bits) of the VPI and VCI of the received data cell that will be selected by the selection circuit 222. Once selected, these bits are catenated (e.g., into an 18 bit string, although other sizes may be employed) and added to the first memory base offset for the respective entry. In this manner, the port number bits field 216, the VPI bits field 218 and/or the VCI bits field 220 (along with the first memory base offset field 214 and any system memory offset) identify a specific location of the system memory 104 that contains a receive control block for a particular port/virtual path/virtual channel combination.

FIG. 3 is a schematic diagram of exemplary contents for the first four entries 302a-d of the first, on-chip memory 110 of FIG. 2. Fewer or more entries may be employed. For convenience, it is assumed that only port number bits are employed by the masked select and compress logic 202 to generate addresses for the first, on-chip memory 110. Further, it is assumed that (1) the first port 106a of the network processor system 100 employs 256 virtual paths, with 256 virtual channels per path; (2) the second port 106b of the network processor system 100 employs 4 virtual paths, with 4096 virtual channels per path; and (3) the third port 106c of the network processor system 100 employs 16 virtual paths, with 16 virtual channels per path. The number of virtual paths and number of channels are not specified for the fourth port 106d of the network processor system 100. It will be understood that the above configuration is merely exemplary, and that other network processor configurations may be employed.

With reference to FIG. 3, the first entry 302a of the first, on-chip memory 110 is assigned a first memory base offset field 214 value of 0 0000 0000, specifying that RCBs for the first port 106a are stored within a first portion of the system memory 104. Because only port number bits are employed to address the first, on-chip memory 110, no bits of the port number are specified within the first entry 302a (e.g., the port number bits field 216 has a value of 000). With 256 unique virtual paths associated with the first port 106a, 8 bits of the VPI of a data cell received via the first port 106a are selected by the selection circuit 222 (e.g., a value of 1000 is employed for the VPI bits field 218 of the first entry 302a). Further, with 256 unique virtual channels associated with each virtual path of the first port 106a, 8 bits of the VCI of a data cell received via the first port 106a are selected by the selection circuit 222 (e.g., a value of 0 1000 is employed for the VCI bits field 220 of the first entry 302a). Similar selections of the number of bits for the port number bits field 216, the VPI bits field 218 and the VCI bits field 220 may be made for the second and third entries 302b, 302c of the first, on-chip memory 110 based on the number of virtual paths and virtual channels per path for the second and third ports 106b, 106c of the network processor system 100. Note that because the first port 106a employs 256 virtual paths×256 virtual channels=65,536 connections, 65,536/512=128 (or binary 0 1000 0000) is employed for the value of the first memory base offset field 214 of the second entry 302b of the first, on-chip memory 110. Further, despite the third port 106c employing only 16 virtual paths×16 virtual channels=256 connections, and 256/512=0.5, the value of the first memory base offset field 214 of the fourth entry 302d of the first, on-chip memory 110 effectively results in 512 RCB locations of the system memory 104 being reserved for the third port 106c of the network processor system 100.

Figure 4:
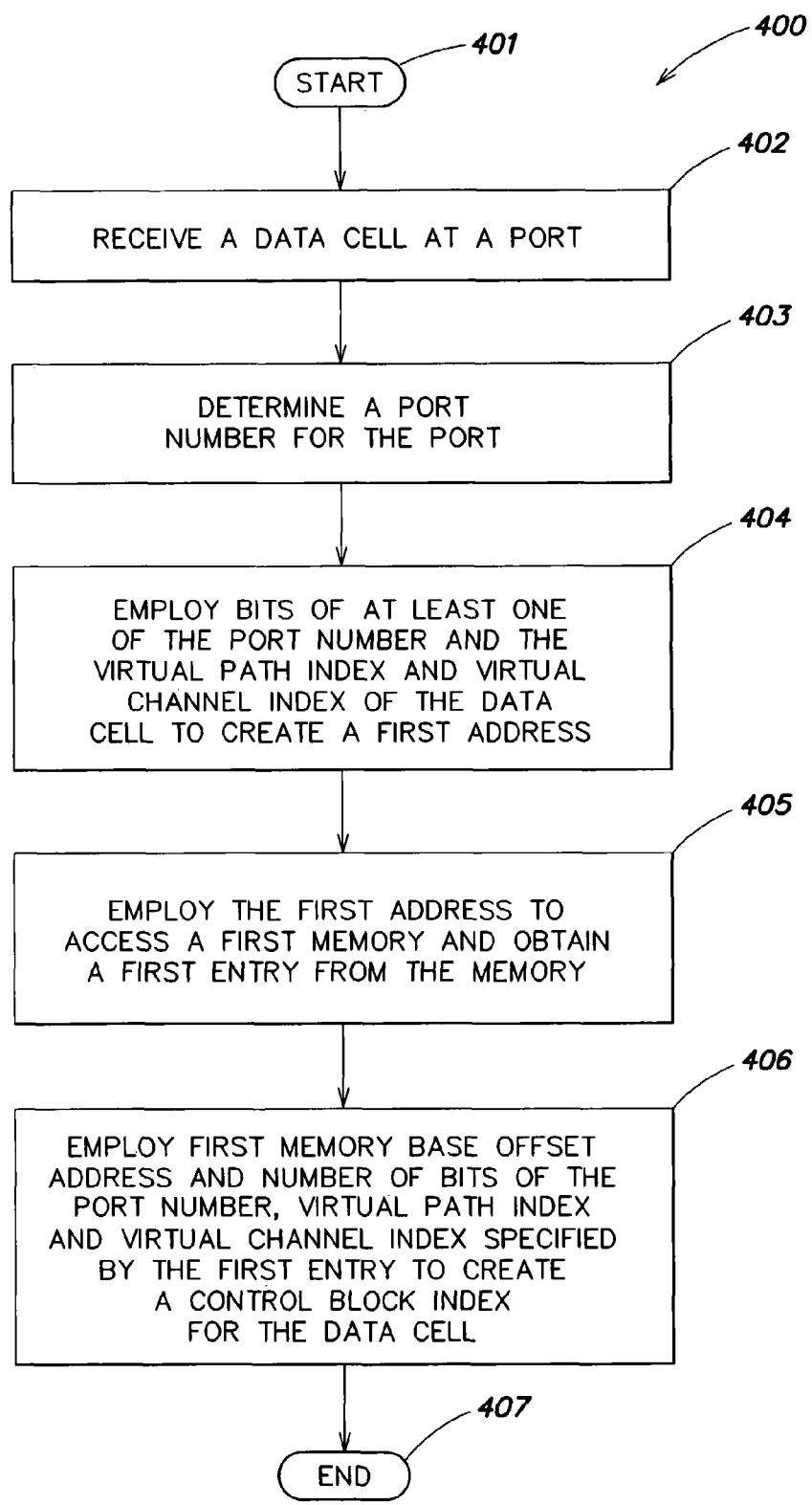
FIG. 4 is a process flow diagram of a method for determining a control block index for a data cell received by a network processor coupled to an ATM network.

The operation of the network processor system 100 is now described with reference to FIGS. 1-2, and with reference to FIG. 4 which illustrates an exemplary method 400 of determining a control block index for a data cell received by the network processor system 100 of FIGS. 1-2. With reference to FIG. 4, in step 401 the method 400 begins. In step 402, a data cell is received at a port. For example, the first port 106a of the network processor 102 may receive an ATM cell. As stated, the header of a data cell includes the VPI and VCI for the data cell. Following the receiving of the data cell, in step 403, a port number is determined for the port at which the data cell was received. For example, the processor 102 or the programmable logic circuit 112 may determine the port number.

In step 404, bits of at least one of the port number, VPI, and VCI of the data cell are employed to create a first address. For example, the masked select and compress logic 202 may (1) receive bits of at least one of the port number, VPI, and VCI (e.g., from the processor 102 or logic circuit 112); (2) select certain bits by applying a mask to the received bits; and (3) compress the selected bits to form a first address for the first, on-chip memory 110. In step 405, the first address may be employed to access a first memory and obtain a first entry from the memory. For example, (as shown in FIG. 2), the 7-bit output of the masked select and compress logic 202 may be used to address the first, on-chip memory 110 to obtain a 21-bit entry 212.

In step 406, the first memory base offset address and the number of bits of the port number, VPI, and VCI specified by the first entry are employed to create a control-block index for the data cell. For example, as shown in FIG. 2, one or more bits of the first entry may be employed as select inputs of the selection circuit 222. The select inputs specify the number of port number bits, VPI bits, and VCI bits to be selected by the selection circuit 222. (The selection circuit 222 may also verify that non-selected VPI and VCI bits are zeroed.)

In the embodiment shown in FIG. 2, the selection circuit 222 receives up to 35 bits of port number, VPI and VCI information and selects and outputs 18 bits. The bits selected from the VCI form the LSBs of the 18-bit output. The bits selected from the VPI form the next group of bits of the 18-bit output and the bits selected from the port number form the next group of bits of the 18-bit output. The 18-bit output of the selection circuit 222 is provided as a first input to an adder 226. The first memory base offset then is added to the 9 most significant bits of the 18-bit output of the selection circuit 222 (e.g., via the adder) to form the control block index. In step 407, the method 400 ends.

In one embodiment of the invention, thirty-two memory locations are used to store each control block. Therefore, to accommodate the size of each control block, step 406 may further include shifting the bits of the control block index to the left by five bits (e.g., multiplying by 32). Additionally, the shifted control block index may be added to a main system memory base offset to determine a memory address of a control block (e.g., a control block memory address) that corresponds to the received data cell. The memory address then may be employed to obtain a control block from the main system memory 104.

The foregoing description discloses only exemplary embodiments of the invention. Modifications of the above disclosed apparatus and method which fall within the scope of the invention will be readily apparent to those of ordinary skill in the art. For instance, the memory and/or field sizes described herein are merely exemplary. Other memory and/or field sizes may be employed.

Accordingly, while the present invention has been disclosed in connection with exemplary embodiments thereof, it should be understood that other embodiments may fall within the spirit and scope of the invention as defined by the following claims.

The invention claimed is:

1. A method for determining a control block index for a data cell received by a network processor coupled to an ATM network comprising:
receiving a data cell at a port of the network processor, the data cell having a virtual path identifier and a virtual channel identifier, wherein the network processor includes a microprocessor and on-chip hardware, both on a same chip, and wherein the on-chip hardware includes a logic circuit and on-chip memory;
determining, by the network processor, a port number for the port;
employing, by the network processor, bits of at least one of the virtual path identifier, the virtual channel identifier and the port number to create a first address;
employing, by the network processor, the first address to access the on-chip memory and to obtain a first entry from the on-chip memory, the first entry including a data structure, the data structure including a plurality of fields including:
a field representative of a first base memory address;
a field representative of a number of bits of the port number to use in the control block index;
a field representative of a number of bits of the virtual path identifier to use in the control block index; and
a field representative of a number of bits of the virtual channel identifier to use in the control block index; and
employing the first base memory address and the number of bits of the port number, virtual path identifier- and virtual channel identifier specified by the first entry to create the control block index for the data cell.

2. The method of claim 1 wherein employing bits of at least one of the virtual path identifier, the virtual channel identifier and the port number to create the first address comprises employing bits of at least one of the virtual path identifier and the port number to create the first address.

3. The method of claim 1 wherein the on-chip memory comprises an on-chip random access memory.

4. The method of claim 1 wherein employing the first base memory address and the number of bits of the port number, virtual path identifier and virtual channel identifier specified by the first entry to create the control block index for the data cell comprises:
selecting the number of bits of the port number specified by the first entry;
selecting the number of bits of the virtual path identifier specified by the first entry;
selecting the number of bits of the virtual channel identifier specified by the first entry;
catenating any selected bits; and
adding the catenated selected bits to the first base memory address.

5. The method of claim 4 further comprising:
shifting the control block index; and
adding the shifted control block index to a main system memory base offset so as to generate a control block memory address.

6. The method of claim 5 further comprising employing the control block memory address to obtain a control block from a main system memory.

7. The method of claim 4 further comprising verifying that non-selected port number, virtual path identifier and virtual channel identifier bits are zeroed.

8. The method of claim 1 further comprising pre-selecting which bits are used to form the first address.

9. The method of claim 1 further comprising selecting each entry for the on-chip memory.

10. A system adapted to determine a control block index for each data cell received by a network processor coupled to an ATM network comprising:
a network processor including a microprocessor and on-chip hardware, both on a same chip, wherein the on-chip hardware includes a logic circuit and on-chip memory,
wherein the on-chip memory includes a plurality of entries, each entry including a data structure having a plurality of fields, the fields including:
a field representative of a base memory address;
a field representative of a number of bits of a port number of a port that receives a data cell to use in the control block index;
a field representative of a number of bits of a virtual path identifier of the data cell to use in the control block index; and
a field representative of a number of bits of a virtual channel identifier of the data cell to use in the control block index; and
wherein the logic circuit is adapted to:
generate an address for accessing the on-chip memory based on bits of at least one of a port number of a port that receives a first data cell, a virtual path identifier for the first data cell and a virtual channel identifier for the first data cell;
employ the address to obtain an entry of the on-chip memory; and
employ the base memory address and the number of bits of the port number, virtual path identifier and virtual channel identifier specified by the entry to create a control block index for the first data cell.

11. The system of claim 10 wherein the logic circuit is adapted to create the control block index for the first data cell by:
selecting the number of bits of the port number specified by the entry of the on-chip memory;
selecting the number of bits of the virtual path identifier specified by the entry;
selecting the number of bits of the virtual channel identifier specified by the entry;
catenating any selected bits; and
adding the catenated selected bits to the base memory address specified by the entry to form the control block index.

12. The system of claim 11 wherein the logic circuit is further adapted to:
shift the control block index; and
add the shifted control block index to a main system memory base offset so as to generate a control block memory address.

13. The system of claim 10 wherein the microprocessor is adapted to:
determine each entry within the on-chip memory; and
determine which bits of a port number of a port that receives a data cell, a virtual path identifier for the data cell and a virtual channel identifier for the data cell are employed to generate an address for the on-chip memory.

14. A method for address mapping in a network processor, the method comprising:
providing a network processor including a processor and on-chip hardware, both on a same chip, wherein the on-chip hardware includes a logic circuit and on-chip memory, wherein the on-chip memory includes a plurality of entries, each entry including a data structure having a plurality of fields, the fields including:
a field representative of a base memory address;
a field representative of a number of bits of a port number of a port that receives a data cell to use in the control block index;
a field representative of a number of bits of a virtual path identifier of the data cell to use in the control block index; and
a field representative of a number of bits of a virtual channel identifier of the data cell to use in the control block index;
determining a port number of a port that receives a data cell;
determining a virtual path identifier and a virtual channel identifier for the data cell;
creating a first index based on at least one of the port number, the virtual path identifier and the virtual channel identifier;
accessing one of the plurality of entries stored in the on-chip memory using the first index;
creating a second index based on the accessed entry of the on-chip memory; and
accessing an entry of a second memory based on the second index.

15. A system adapted to perform address mapping in a network processor comprising:
an on-chip memory having a plurality of entries, each entry including a data structure having a plurality of fields, the fields including:
a field representative of a base memory address;
a field representative of a number of bits of a port number of a port that receives a data cell to use in the control block index;
a field representative of a number of bits of a virtual path identifier of the data cell to use in the control block index; and
a field representative of a number of bits of a virtual channel identifier of the data cell to use in the control block index;
and
a logic circuit adapted to:
create a first index based on at least one of a number of a port that receives a data cell, a virtual path identifier for the data cell and a virtual channel identifier for the data cell;
access one of the plurality of entries stored in the on-chip memory using the first index; and
create a second index based on the accessed entry of the on-chip memory.

* * * * *